(12) United States Patent
Gobara

(10) Patent No.: US 9,128,178 B2
(45) Date of Patent: Sep. 8, 2015

(54) CORRELATION CALCULATION PROCESS EXECUTION METHOD, CONTROL CIRCUIT, SIGNAL PROCESSING CIRCUIT, AND POSITION CALCULATION DEVICE

(75) Inventor: Naoki Gobara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1147 days.

(21) Appl. No.: 12/341,421

(22) Filed: Dec. 22, 2008

(65) Prior Publication Data

US 2009/0168853 A1    Jul. 2, 2009

(30) Foreign Application Priority Data

Dec. 27, 2007  (JP) ................................. 2007-335946
Sep. 30, 2008  (JP) ................................. 2008-253279

(51) Int. Cl.
G06F 17/30    (2006.01)
G01S 19/30    (2010.01)
G01S 19/39    (2010.01)
G01S 19/34    (2010.01)

(52) U.S. Cl.
CPC ................. *G01S 19/30* (2013.01); *G01S 19/34* (2013.01); *G01S 19/39* (2013.01); *G06F 17/30038* (2013.01)

(58) Field of Classification Search
CPC ....... G01S 5/0027; G01S 19/39; G01S 19/30; G01S 19/34
USPC ............. 455/65, 456.6, 456.1; 370/386, 450, 370/453; 342/357.02, 357, 31, 357.68, 358
See application file for complete search history.

(56) References Cited

U.S. PATENT DOCUMENTS

| | | | | |
|---|---|---|---|---|
| 7,369,516 | B1 * | 5/2008 | Fisher et al. | 370/292 |
| 7,949,005 | B2 * | 5/2011 | Li et al. | 370/437 |
| 2001/0033627 | A1 * | 10/2001 | Syrjarinne | 375/354 |
| 2002/0114382 | A1 * | 8/2002 | Goren et al. | 375/222 |
| 2002/0186794 | A1 * | 12/2002 | Oesch et al. | 375/340 |
| 2004/0234008 | A1 * | 11/2004 | Diggelen et al. | 375/343 |
| 2005/0162313 | A1 * | 7/2005 | Ito et al. | 342/357.15 |
| 2005/0168382 | A1 * | 8/2005 | Awata | 342/357.02 |
| 2005/0175075 | A1 * | 8/2005 | Martin et al. | 375/149 |

(Continued)

FOREIGN PATENT DOCUMENTS

JP    2001-042023 A    2/2001

OTHER PUBLICATIONS

Extended European Search Report dated May 6, 2011 for the counterpart European Patent Application No. 08172754.7.

*Primary Examiner* — Mohammad S Rostami
(74) *Attorney, Agent, or Firm* — Global IP Counselors, LLP

(57) ABSTRACT

A correlation calculation process execution method utilizes a first mode and a second mode as a positioning mode that performs a correlation calculation process on a received signal of a positioning signal that is spread-modulated by a spreading code and a signal replica of the spreading code, the first mode being a mode in which correlation values are averaged in a first mode process period to output a correlation value, and the second mode being a mode in which correlation values are integrated in a second mode process period to output a correlation value, the method including repeating the first mode and the second mode while setting an intermediate time of the first mode process period to be the same as an integration reference time of the second mode process period, and variably setting a ratio of an ON/OFF period in at least one period of the first mode process period and the second mode process period.

9 Claims, 13 Drawing Sheets

OUTDOOR MODE

(56) References Cited

U.S. PATENT DOCUMENTS

| | | | |
|---|---|---|---|
| 2006/0217990 A1* | 9/2006 | Theimer et al. | 705/1 |
| 2007/0058700 A1* | 3/2007 | Fenton | 375/150 |
| 2007/0070060 A1* | 3/2007 | Kagawa et al. | 345/418 |
| 2007/0090994 A1 | 4/2007 | Young | |
| 2007/0149194 A1* | 6/2007 | Das et al. | 455/436 |
| 2007/0201539 A1* | 8/2007 | Yu et al. | 375/148 |
| 2007/0217535 A1* | 9/2007 | Nakamura | 375/260 |
| 2007/0273574 A1* | 11/2007 | Barnum | 342/90 |
| 2007/0274374 A1* | 11/2007 | Abraham | 375/148 |
| 2009/0037503 A1* | 2/2009 | Peng | 708/207 |
| 2009/0052506 A1* | 2/2009 | Valio et al. | 375/150 |
| 2009/0141775 A1* | 6/2009 | Kober et al. | 375/148 |
| 2009/0207951 A1* | 8/2009 | Kim et al. | 375/343 |

\* cited by examiner

INDOOR MODE AND OUTDOOR MODE

POWER-SAVING OPERATION

POWER-SAVING OPERATION CONTROL TABLE

| POWER-SAVING OPERATION MODE | RATIO X | ON TIMING | OFF TIMING |
|---|---|---|---|
| MODE A | 0.2(20%) | 400 | 600 |
| MODE B | 0.4(40%) | 300 | 700 |
| MODE C | 0.5(50%) | 250 | 750 |
| MODE D | 0.6(60%) | 200 | 800 |
| MODE E | 0.8(80%) | 100 | 900 |

CORRELATION OPERATION CONTROL TABLE

| POWER-SAVING OPERATION MODE | CALCULATION TIMING | | INTEGRATION RESET TIMING | |
|---|---|---|---|---|
| | INDOOR MODE | OUTDOOR MODE | INDOOR MODE | OUTDOOR MODE |
| MODE A | 500 | 600 | 500 | 1000 |
| MODE B | 500 | 700 | 500 | 1000 |
| MODE C | 500 | 750 | 500 | 1000 |
| MODE D | 500 | 800 | 500 | 1000 |
| MODE E | 500 | 900 | 500 | 1000 |

FIG. 13
POSITIONING MODE DATA
| RECEPTION CHANNEL | POSITIONING MODE | ACQUISITION TARGET SATELLITE |
|---|---|---|
| 1 | INDOOR MODE | #1 |
| 2 | INDOOR MODE | #2 |
| ⋮ | ⋮ | ⋮ |
| n | OUTDOOR MODE | #N |
FIG. 14
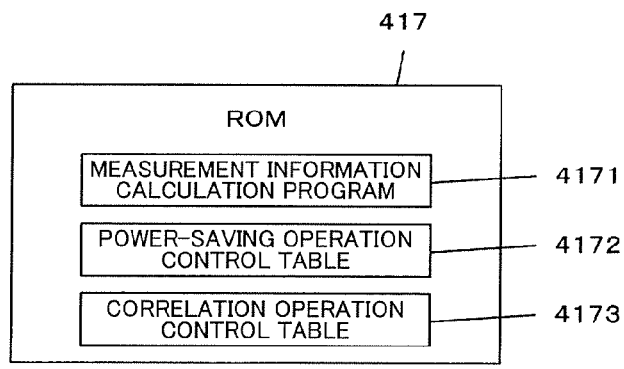
FIG. 15
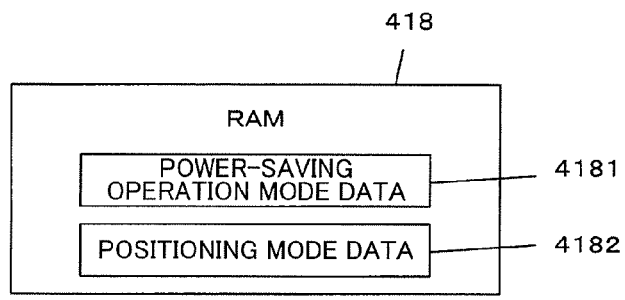

CORRELATION CALCULATION PROCESS EXECUTION METHOD, CONTROL CIRCUIT, SIGNAL PROCESSING CIRCUIT, AND POSITION CALCULATION DEVICE

Japanese Patent Application No. 2007-335946 filed on Dec. 27, 2007 and Japanese Patent Application No. 2008-253279 filed on Sep. 30, 2008, are hereby incorporated by reference in their entirety.

BACKGROUND

The present invention relates to a correlation calculation process execution method, a control circuit, a signal processing circuit, and a position calculation device.

The global positioning system (GPS) is widely known as a positioning system utilizing a positioning signal. The GPS is utilized for a position calculation device provided in a portable telephone, a car navigation system, and the like. A GPS receiver locates its current position by calculating four parameters (i.e., three-dimensional coordinate values that indicate the position of the GPS receiver and a clock error) based on information such as the positions of a plurality of GPS satellites and the pseudo-range between each GPS satellite and the GPS receiver (i.e., positioning calculations).

A GPS receiver has been known that performs an intermittent positioning operation in which a positioning period and a suspension period are repeated in order to reduce power consumption. In the suspension period, the operations of a frequency conversion section that down-converts the received signal into an intermediate-frequency (IF) signal and a signal processing section that performs correlation calculations on the received signal and a code replica are suspended (see JP-A-2001-42023, for example).

A GPS receiver may have a plurality of positioning modes corresponding to the reception environments such as an outdoor environment and an indoor environment. For example, the correlation value is calculated by averaging the correlation values in the outdoor environment mode since the signal strength is relatively high. On the other hand, the correlation value is calculated by integrating the correlation values in the indoor environment mode since the signal strength is low. Specifically, since the process that calculates the correlation value differs corresponding to the positioning mode, the observation target time (measurement time) of measurement information to be calculated differs even if the target period is the same. When executing a plurality of positioning modes in parallel and performing positioning calculations using the measurement information calculated in each positioning mode, a process that corrects the measurement information so that the measurement time coincides with a given time (hereinafter referred to as "propagation process") is performed. However, since the measurement information is modified by the propagation process, the positioning accuracy deteriorates. The degree of deterioration increases as the difference between the given time and the measurement time increases.

When executing a plurality of positioning modes in parallel during the intermittent positioning operation, it is necessary to control the operation while taking into consideration the relationship between the target period in each positioning mode and the positioning/suspension period of the intermittent positioning operation. Specifically, since the measurement time of the measurement information changes due to the difference in the positioning/suspension period included in the correlation calculation target period, the difference in the measurement time of the measurement information calculated in each positioning mode increases. As a result, a positioning error due to the propagation process increases.

SUMMARY

According to one aspect of the invention, there is provided a correlation calculation process execution method that utilizes a first mode and a second mode as a positioning mode that performs a correlation calculation process on a received signal of a positioning signal that is spread-modulated by a spreading code and a signal replica of the spreading code, the method comprising:

repeating the first mode and the second mode while setting an intermediate time of a first mode process period to be the same as an integration reference time of a second mode process period, the first mode being a mode in which correlation values are averaged in the first mode process period to output a correlation value, and the second mode being a mode in which correlation values are integrated in the second mode process period to output a correlation value; and variably setting a ratio of an ON/OFF period in at least one period of the first mode process period and the second mode process period.

According to another aspect of the invention, there is provided a control circuit that controls an operation of a correlation calculation circuit that has a first mode and a second mode as a positioning mode that performs a correlation calculation process on a received signal of a positioning signal that is spread-modulated by a spreading code and a signal replica of the spreading code, the first mode being a mode in which the correlation calculation circuit averages correlation values in a first mode process period to output a correlation value, and the second mode being a mode in which the correlation calculation circuit integrates correlation values in a second mode process period to output a correlation value, the correlation calculation circuit repeating the first mode and the second mode while setting an intermediate time of the first mode process period to be the same as an integration reference time of the second mode process period, the control circuit comprising:

a period variably setting section that variably sets a ratio of an ON/OFF period in at least one period of the first mode process period and the second mode process period; and an operation control section that controls the operation of the correlation calculation circuit according to the ratio set by the period variably setting section.

According to another aspect of the invention, there is provided a signal processing circuit comprising:

a correlation calculation circuit that has a first mode and a second mode as a positioning mode that performs a correlation calculation process on a received signal of a positioning signal that is spread-modulated by a spreading code and a signal replica of the spreading code, the first mode being a mode in which the correlation calculation circuit averages correlation values in a first mode process period to output a correlation value, and the second mode being a mode in which the correlation calculation circuit integrates correlation values in a second mode process period to output a correlation value, the correlation calculation circuit repeating the first mode and the second mode while setting an intermediate time of the first mode process period to be the same as an integration reference time of the second mode process period; and a control circuit that includes a period variably setting section that variably sets a ratio of an ON/OFF period in at least one of the first mode process period and the second mode process period.

BRIEF DESCRIPTION OF THE DRAWINGS

FIG. 13 shows a data configuration example of positioning mode data.
FIG. 14 is a configuration diagram showing a ROM.
FIG. 15 is a configuration diagram showing a RAM.

DESCRIPTION OF EXEMPLARY EMBODIMENTS

Figure 1:
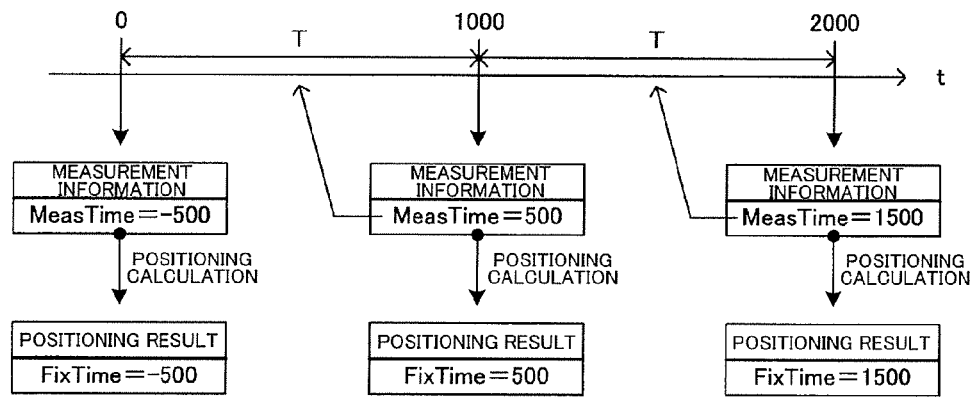
FIG. 1 is a view illustrative of an outdoor mode.

Several embodiments of the invention may prevent an increase in positioning error due to the propagation process.

According to one embodiment of the invention, there is provided a correlation calculation process execution method that utilizes a first mode and a second mode as a positioning mode that performs a correlation calculation process on a received signal of a positioning signal that is spread-modulated by a spreading code and a signal replica of the spreading code, the method comprising:

repeating the first mode and the second mode while setting an intermediate time of a first mode process period to be the same as an integration reference time of a second mode process period, the first mode being a mode in which correlation values are averaged in the first mode process period to output a correlation value, and the second mode being a mode in which correlation values are integrated in the second mode process period to output a correlation value; and variably setting a ratio of an ON/OFF period in at least one period of the first mode process period and the second mode process period.

According to another embodiment of the invention, there is provided a control circuit that controls an operation of a correlation calculation circuit that has a first mode and a second mode as a positioning mode that performs a correlation calculation process on a received signal of a positioning signal that is spread-modulated by a spreading code and a signal replica of the spreading code, the first mode being a mode in which the correlation calculation circuit averages correlation values in a first mode process period to output a correlation value, and the second mode being a mode in which the correlation calculation circuit integrates correlation values in a second mode process period to output a correlation value, the correlation calculation circuit repeating the first mode and the second mode while setting an intermediate time of the first mode process period to be the same as an integration reference time of the second mode process period, the control circuit comprising:

a period variably setting section that variably sets a ratio of an ON/OFF period in at least one period of the first mode process period and the second mode process period; and an operation control section that controls the operation of the correlation calculation circuit according to the ratio set by the period variably setting section.

According to another embodiment of the invention, there is provided a signal processing circuit comprising:

a correlation calculation circuit that has a first mode and a second mode as a positioning mode that performs a correlation calculation process on a received signal of a positioning signal that is spread-modulated by a spreading code and a signal replica of the spreading code, the first mode being a mode in which the correlation calculation circuit averages correlation values in a first mode process period to output a correlation value, and the second mode being a mode in which the correlation calculation circuit integrates correlation values in a second mode process period to output a correlation value, the correlation calculation circuit repeating the first mode and the second mode while setting an intermediate time of the first mode process period to be the same as an integration reference time of the second mode process period; and a control circuit that includes a period variably setting section that variably sets a ratio of an ON/OFF period in at least one of the first mode process period and the second mode process period.

According to the above configuration, the first mode and the second mode are repeated while setting the intermediate time of the first mode process period to be the same as the integration reference time of the second mode process period. The ratio of the ON/OFF period in at least one period of the first mode process period and the second mode process period is variably set.

In the first mode, the correlation values are averaged to output the correlation value. The output correlation value is a value at the intermediate time of the first mode process period. In the second mode, the correlation values are integrated to output the correlation value. The output correlation value is a value at the integration reference time of the second mode process period. The term "integration reference time" refers to a synchronization time when integrating the correlation values.

Since the intermediate time of the first mode process period does not necessarily coincide with the integration reference time of the second mode process period, the correlation values at different times may be output. Therefore, the first mode process period and the second mode process period are shifted so that the intermediate time of the first mode process period is the same as the integration reference time of the second mode process period. Moreover, the ratio of the ON/OFF period in at least one period of the first mode process period and the second mode process period is variably set. According to this configuration, a positioning error that occurs when executing a plurality of positioning modes that differ in correlation calculation process in parallel while performing a power-saving operation (intermittent positioning) can be reduced.

In the correlation calculation process execution method, the first mode process period and the second mode process period may be shifted by half of the first mode process period and the second mode process period.

In the signal processing circuit, the correlation calculation circuit may execute the first mode and the second mode in parallel in a state in which the first mode process period and the second mode process period are shifted by half of the first mode process period and the second mode process period.

According to the above configuration, the first mode and the second mode are executed in parallel in a state in which the first mode process period and the second mode process period are shifted by half of the first mode process period and the second mode process period. For example, when the first mode process period is the same as the second mode process period and the integration reference time in the second mode is set at the start time of the second mode process period, the intermediate time of the first mode process period and the integration reference time of the second mode process period are shifted by a half cycle. Therefore, the correlation values at the same time are output by shifting the first mode process period and the second mode process period by half of the first mode process period and the second mode process period.

In the correlation calculation process execution method, an ON period and an OFF period that respectively occur at identical timings may be set in the first mode process period and the second mode process period; and an interval between an intermediate time of the ON period and an intermediate time of the subsequent ON period may correspond to the second mode process period, and an interval between an intermediate time of the OFF period and an intermediate time of the subsequent OFF period may correspond to the first mode process period.

In the signal processing circuit, the period variably setting section of the control circuit may set an ON period and an OFF period that respectively occur at identical timings in the first mode process period and the second mode process period; and the correlation calculation circuit may execute the second mode using an interval between an intermediate time of the ON period and an intermediate time of the subsequent ON period as the second mode process period, and may execute the first mode using an interval between an intermediate time of the OFF period and an intermediate time of the subsequent OFF period as the first mode process period.

According to the above configuration, the ON period and the OFF period that occur at identical timings are set in the first mode process period and the second mode process period. The interval between the intermediate time of the ON period and the intermediate time of the subsequent ON period corresponds to the second mode process period, and the interval between the intermediate time of the OFF period and the intermediate time of the subsequent OFF period corresponds to the first mode process period.

In the correlation calculation process execution method, an ON period and an OFF period may be set in the first mode process period; and an intermediate time of the ON period of the first mode process period may be the same as the integration reference time of the second mode process period.

In the signal processing circuit, the period variably setting section of the control circuit may set an ON period and an OFF period in the first mode process period; and the correlation calculation circuit may execute the first mode and the second mode so that an intermediate time of the ON period of the first mode process period is the same as the integration reference time of the second mode process period.

According to the above configuration, the ON period and OFF period are set in the first mode process period, and the intermediate time of the ON period of the first mode process period is the same as the integration reference time of the second mode process period.

In the correlation calculation process execution method, an ON period and an OFF period may be set in the second mode process period; and the intermediate time of the first mode process period may be the same as the integration reference time of the second mode process period.

In the signal processing circuit, the period variably setting section of the control circuit may set an ON period and an OFF period in the second mode process period; and the correlation calculation circuit may execute the first mode and the second mode so that the intermediate time of the first mode process period is the same as the integration reference time of the second mode process period.

According to the above configuration, the ON period and OFF period are set in the second mode process period, and the intermediate time of the first mode process period is the same as the integration reference time of the second mode process period.

The correlation calculation process execution method may further comprise:
  inputting an instruction signal relating to the ratio, the ratio of the ON/OFF period may be variably set based on the instruction signal.

According to the above configuration, the ratio of the ON/OFF period can be variably set based on the instruction signal relating to the ratio that is input from the outside.

According to another embodiment of the invention, there is provided a position calculation device comprising:
  one of the above signal processing circuits; and
  a positioning calculation circuit that performs positioning calculations using a correlation result of the correlation calculation process circuit,
  the positioning calculation circuit outputting an instruction signal relating to the ratio to the control circuit of the signal processing circuit; and
  the period variably setting section of the control circuit variably setting the ratio of the ON/OFF period based on the instruction signal.

According to the above configuration, the instruction signal relating to the ratio is output from the positioning calculation circuit to the control circuit of the signal processing circuit. The control circuit variably sets the ratio of the ON/OFF period based on the input instruction signal.

Embodiments of the invention are described below with reference to the drawings. Note that the following embodiments do not in any way limit the scope of the invention laid out in the claims. Note that all elements of the following embodiments should not necessarily be taken as essential requirements for the invention.

Preferred embodiments of the invention are described below with reference to the drawings. In the following description, the invention is applied to a portable telephone (i.e., GPS receiver) that is one type of electronic instrument that includes a position calculation device.

Principle (A) Positioning Mode

A GPS receiver according to this embodiment can execute an outdoor mode (first mode) and an indoor mode (second mode).

The outdoor mode is a positioning mode suitable for an environment (e.g., outdoor) in which the strength of a received signal is relatively high. In the outdoor mode, measurement information is calculated by averaging correlation values in a given target period T. FIG. 1 is a view showing an example of the outdoor mode. In FIG. 1, the horizontal axis indicates a system time t that is the internal time of the GPS receiver. FIG. 1 shows the measurement information calculation timing based on the system time t. The unit for the system time is milliseconds (msec). In the outdoor mode, the measurement information is calculated at intervals of a given target period T (e.g., one sec) based on the correlation calculation result obtained in the target period T, as shown in FIG. 1. The term "measurement information" refers to information relating to the received signal used for positioning calculations. The measurement information includes the reception frequency and the code phase of the received signal.

The GPS receiver samples the received signal at given sampling intervals (e.g., 20 msec) that are shorter than the target period T, and performs correlation calculations on the sampled data and a code replica to calculate a correlation value. In the outdoor mode, the average value of all correlation values calculated in the target period T is taken as the correlation calculation result in the target period T. Specifically, the calculated measurement information corresponds to a value at the intermediate time of the target period T. The time corresponding to the measurement information is referred to as "measurement time (MeasTime)". The measurement time indicates the time when the value corresponding to the measurement information was obtained, but does not indicate the time when calculations were performed.

In FIG. 1, the measurement information calculated at the system time t=1000 is a value calculated based on the correlation calculation result obtained in the target period T from the time t=0 to the time t=1000, for example. The measurement time is the intermediate time t=500 of the target period T. Likewise, the measurement information calculated at the system time t=2000 is a value calculated based on the correlation calculation result obtained in the target period T from the time t=1000 to the time t=2000. The measurement time is the time t=1500.

The positioning result calculated by performing positioning calculations based on the measurement information corresponds to the value of the measurement information at the measurement time. The time corresponding to the positioning result is referred to as "fix time (FixTime)". The fix time indicates the time when the value corresponding to the positioning result was obtained, but does not indicate the time when calculations were performed.

Figure 2:
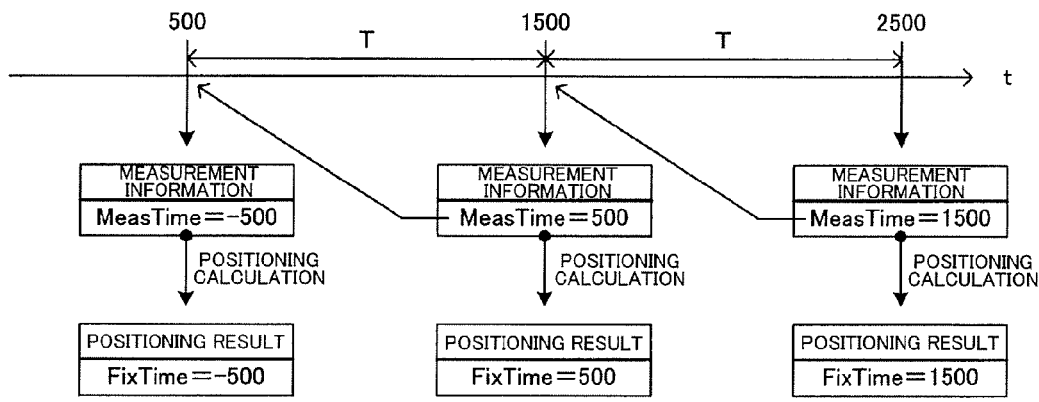
FIG. 2 is a view illustrative of an indoor mode.

The indoor mode is a positioning mode suitable for an environment (e.g., indoor) in which the strength of the received signal is low. In the indoor mode, the measurement information is calculated by integrating correlation values in the given target period T. FIG. 2 is a view showing an example of the indoor mode. In FIG. 2, the horizontal axis indicates the system time t. FIG. 2 shows the measurement information calculation timing based on the system time t in the same manner as FIG. 1. In the indoor mode, the measurement information is calculated at intervals of the given target period T based on the correlation calculation result obtained in the target period T in the same manner as in the outdoor mode, as shown in FIG. 2. In the indoor mode, the integrated value of all correlation values calculated in the target period T is taken as the correlation calculation result in the target period T.

A propagation process that corrects the correlation value at each sample timing to a value at an integration reference time of the target period T is performed before integrating the correlation values. In this embodiment, the integration reference time is set at the start time of the target period T. Note that the integration reference time may be the end time or the intermediate time of the target period T.

In this embodiment, the propagation process is performed as follows. Specifically, a phase CP corresponding to the correlation value at the sample timing is corrected to a phase CP' at the start time of the target period T according to the following expression (1), $$CP'=F/1540 \times LU \times \Delta t/1000 + CP \quad (1)$$

where, $\Delta t$ is the time from the start time of the target period T to the sample timing, and F is the reception frequency of the received signal observed in the target period T. 1540 is a value obtained by dividing the L1-band carrier frequency (1.57542 GHz) of the GPS satellite signal by the modulation cycle (1.023 MHz) of the C/A code. LU is the number by which one chip of the C/A code is divided. The phases CP and CP' are specified at one of the timings determined by dividing one chip by LU. Specifically, the measurement time of the calculated measurement information is the start time of the target period T.

In FIG. 2, the measurement information calculated at the system time t=1500 is a value calculated based on the correlation calculation result obtained in the target period T from the time t=500 to the time t=1500, for example. The measurement time is the start time t=500 of the target period T. Likewise, the measurement information calculated at the system time t=2500 is a value calculated based on the correlation calculation result obtained in the target period T from the time t=1500 to the time t=2500. The measurement time is the time t=1500.

Figure 3:
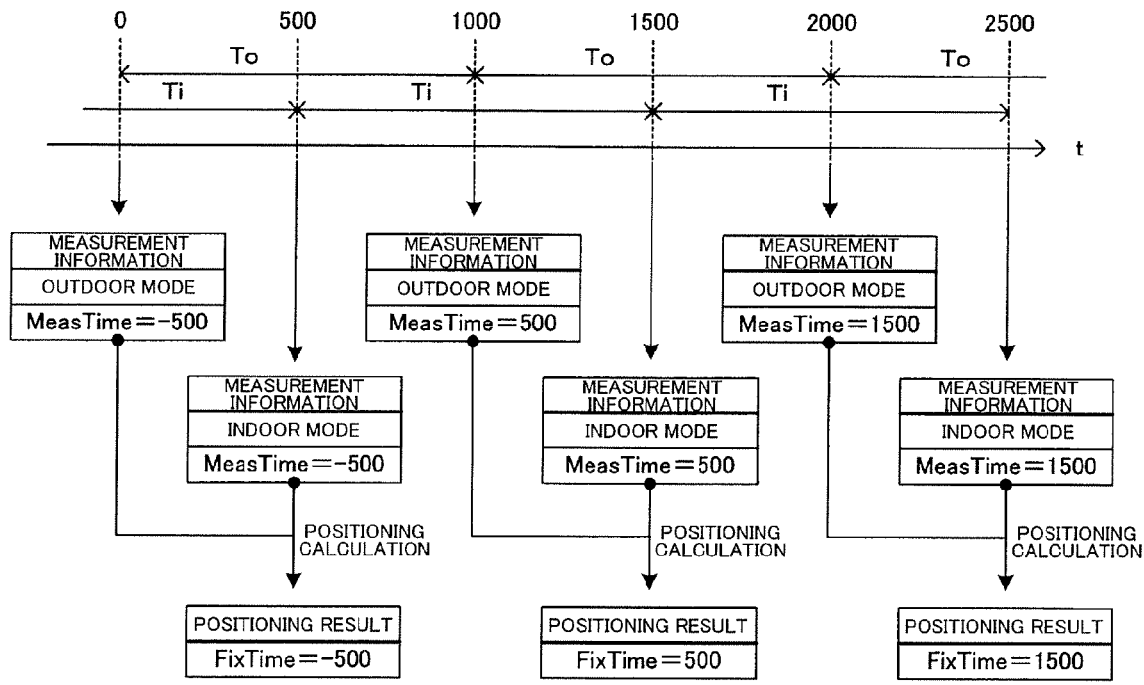
FIG. 3 is a view illustrative of the case where an outdoor mode and an indoor mode are executed in parallel.

The two positioning modes (outdoor mode and indoor mode) can be executed in parallel. In this case, the target period T in the outdoor mode and the target period T in the indoor mode are shifted by half of the target period T. FIG. 3 is a view showing an example in which the outdoor mode and the indoor mode are executed in parallel. As shown in FIG. 3, the outdoor mode and the indoor mode are executed so that a target period To (first mode process period) in the outdoor mode and a target period Ti (second mode process period) in the indoor mode are shifted by half of the target period. Specifically, the measurement information is alternately calculated in the outdoor mode and the indoor mode in a half cycle T/2 of the target period T. Positioning calculations are performed using the measurement information calculated in the indoor mode and the measurement information calculated in the outdoor mode immediately before the indoor mode at the timing when the measurement information has been calculated in the indoor mode. Since the target period T in the outdoor mode and the target period T in the indoor mode are shifted by half of the target period T, the measurement time of the measurement information calculated in the outdoor mode and used for positioning calculations coincides with the measurement time of the measurement information calculated in the indoor mode and used for positioning calculations.

In FIG. 3, the measurement information is calculated in the outdoor mode at the system time t=1000. The measurement time of the measurement information is 500. The measurement information is then calculated in the indoor mode at the system time t=1500. The measurement time of the measurement information is 500. Specifically, the measurement time in the outdoor mode coincides with the measurement time in the indoor mode. Positioning calculations are performed at the time t=1500 based on the measurement information calculated in the outdoor mode and the measurement information calculated in the indoor mode. The fix time (500) of the positioning result is identical to the measurement time. Specifically, it is unnecessary to perform the propagation process that causes the measurement time of the measurement information calculated in one of the positioning modes to coincide with the measurement time of the measurement information calculated in the other positioning mode. Therefore, deterioration in positioning accuracy can be prevented.

In the indoor mode, the measurement time is set at a given integration reference time of the target period Ti for the following reasons. Since the indoor mode is a positioning mode suitable for an environment in which the strength of the received signal is low, it may be difficult to determine the peak of the correlation value within a short integration time of $\Delta t$ msec (e.g., 20 msec). Therefore, when calculating the average value of the correlation values calculated in the target period Ti at intervals of $\Delta t$ msec, the detected measurement information may have low accuracy. Therefore, the peak of the correlation value can be easily determined by integrating the correlation values calculated at intervals of $\Delta t$ msec over the target period Ti.

However, since the code phase changes within $\Delta t$ msec by $F/1540 \times LU \times \Delta t/1000$ chips, the waveform drawn by the correlation values is rounded when merely integrating the correlation values calculated at intervals of $\Delta t$ msec. This makes it difficult to detect an accurate code phase. Therefore, it is reasonable to set the integration reference time and integrate the correlation values in synchronization with the integration reference time. This integration process is referred to as "synchronous integration". The integration reference time may be arbitrarily set. For example, the start time of the target period Ti may be used as the integration reference time. In this embodiment, the measurement time in the indoor mode is set at the start time of the target period Ti.

The necessity for causing the measurement time in the outdoor mode to coincide with the measurement time in the indoor mode is described below. Suppose that the measurement time in the outdoor mode is the time t=2000, and the measurement time in the indoor mode is the time t=1500. Specifically, the measurement time in the outdoor mode does not coincide with the measurement time in the indoor mode. In this case, when positioning calculations are performed at the time t=2000, the measurement information calculated in the indoor mode at the time t=1500 cannot be used directly. Therefore, it is necessary to calculate the measurement information at the time t=2000 by performing the above-mentioned propagation process.

Specifically, when the code phase and the reception frequency detected in the indoor mode at the time t=1500 are respectively referred to as CP0 and F0, the code phase CP1 at the time t=2000 is calculated according to the following expression (2).

$$CP1=F0/1540 \times LU \times 500/1000+CP0 \quad (2)$$

As is clear from the expression (2), the code phase CP1 calculated by the propagation process varies depending on the accuracy of the reception frequency F0 detected at the measurement time. Therefore, an error in the positioning result is reduced by performing positioning calculations using the code phase that is not subjected to the propagation process as long as the accuracy of the reception frequency is not zero. Therefore, it is necessary to set the target period so that the measurement time in the outdoor mode coincides with the measurement time in the indoor mode.

(B) Power-Saving Operation

Figure 4:
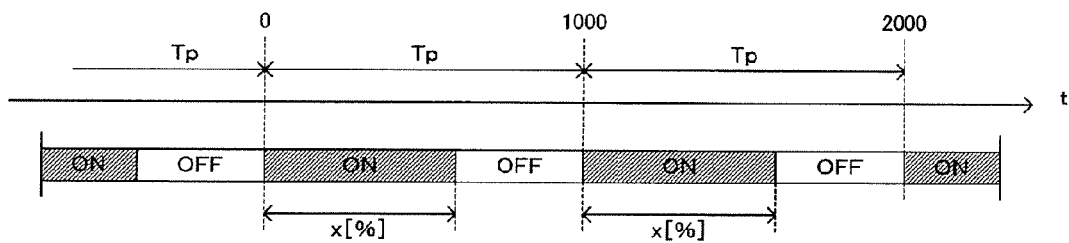
FIG. 4 is a view illustrative of a power-saving operation.

The GPS receiver according to this embodiment performs a power-saving operation (intermittent positioning) that repeats execution/suspension of the correlation calculation process in a given cycle in order to reduce power consumption. FIG. 4 is a view illustrative of the power-saving operation. In FIG. 4, the horizontal axis indicates the system time t. FIG. 4 shows a period (ON period) in which the GPS receiver performs the correlation calculation process and a period (OFF period) in which the GPS receiver suspends the correlation calculation process. In the power-saving operation, the ON period and the OFF period are repeated in an operation cycle that is equal to the measurement information calculation target period T. In a 60% power-saving operation mode, for example, an ON period of 600 msec (60%) and an OFF period of 400 msec (40%) occur within an operation cycle of 1 sec.

Figure 5:
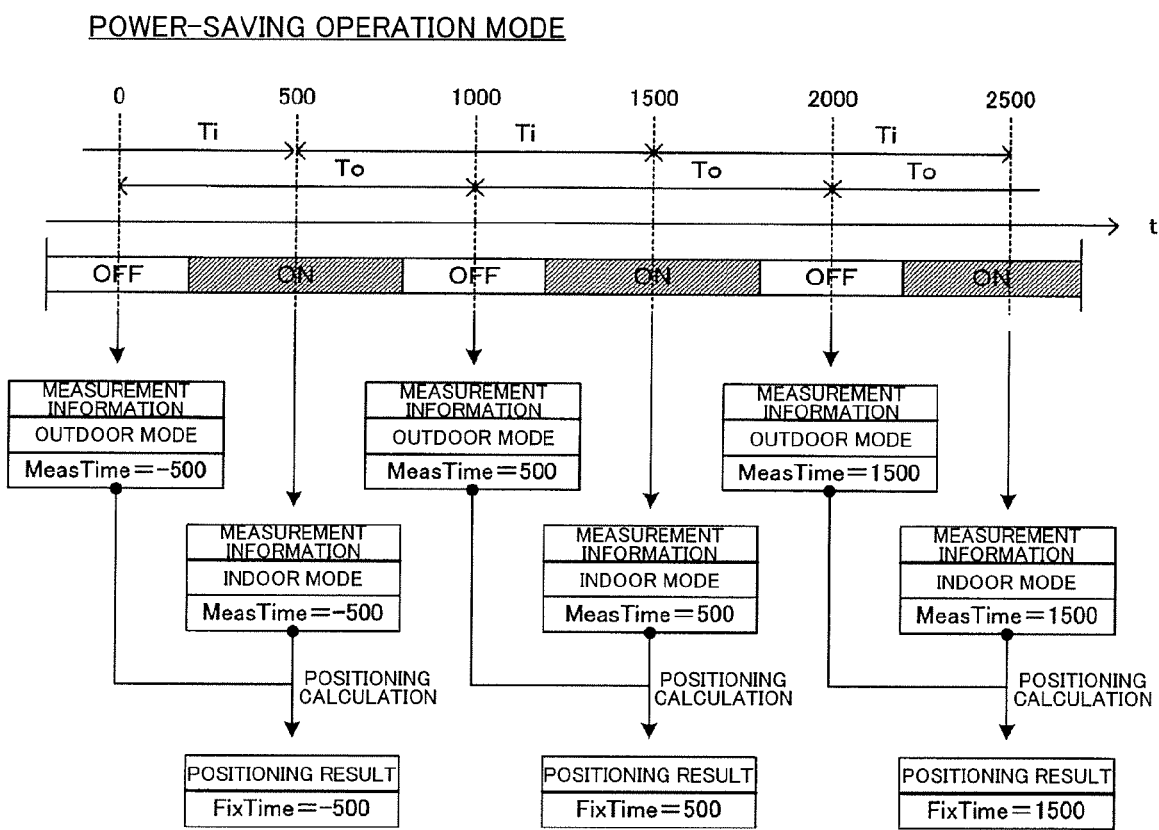
FIG. 5 is a view illustrative of the case where an outdoor mode and an indoor mode are executed in parallel while performing a power-saving operation.

FIG. 5 is a view showing an example in which the GPS receiver executes the two positioning modes in parallel while performing the power-saving operation. In FIG. 5, the horizontal axis indicates the system time t. FIG. 5 shows the ON/OFF periods of the power-saving operation and the measurement information calculation timing in each positioning mode. As shown in FIG. 5, the intermediate time of the ON period of the power-saving operation coincides with the start time/end time of the target period Ti in the indoor mode. Specifically, a period from the intermediate time of the ON period to the intermediate time of the subsequent ON period coincides with the target period Ti in the indoor mode. Therefore, since the start time of the target period Ti in the indoor mode occurs in the ON period, the measurement time of the measurement information calculated in the indoor mode is the start time of the target period Ti.

The intermediate time of the OFF period of the power-saving operation coincides with the start time/end time of the target period To in the outdoor mode. Specifically, a period from the intermediate time of the OFF period to the intermediate time of the subsequent OFF period coincides with the target period To in the outdoor mode. Since the ON period and the OFF period are symmetrically distributed in the target period in the outdoor mode along the time direction with respect to the intermediate time of the target period To, the measurement time of the measurement information calculated in the outdoor mode is the intermediate time of the target period To.

As described above, the measurement time in the indoor mode is the start time of the target period Ti, and the measurement time in the outdoor mode is the intermediate time of the target period To. The target period Ti and the target period To are shifted by a half cycle. Therefore, the measurement time of the measurement information calculated in the indoor mode coincides with the measurement time of the measurement information calculated in the outdoor mode even when performing the power-saving operation.

Figure 6:
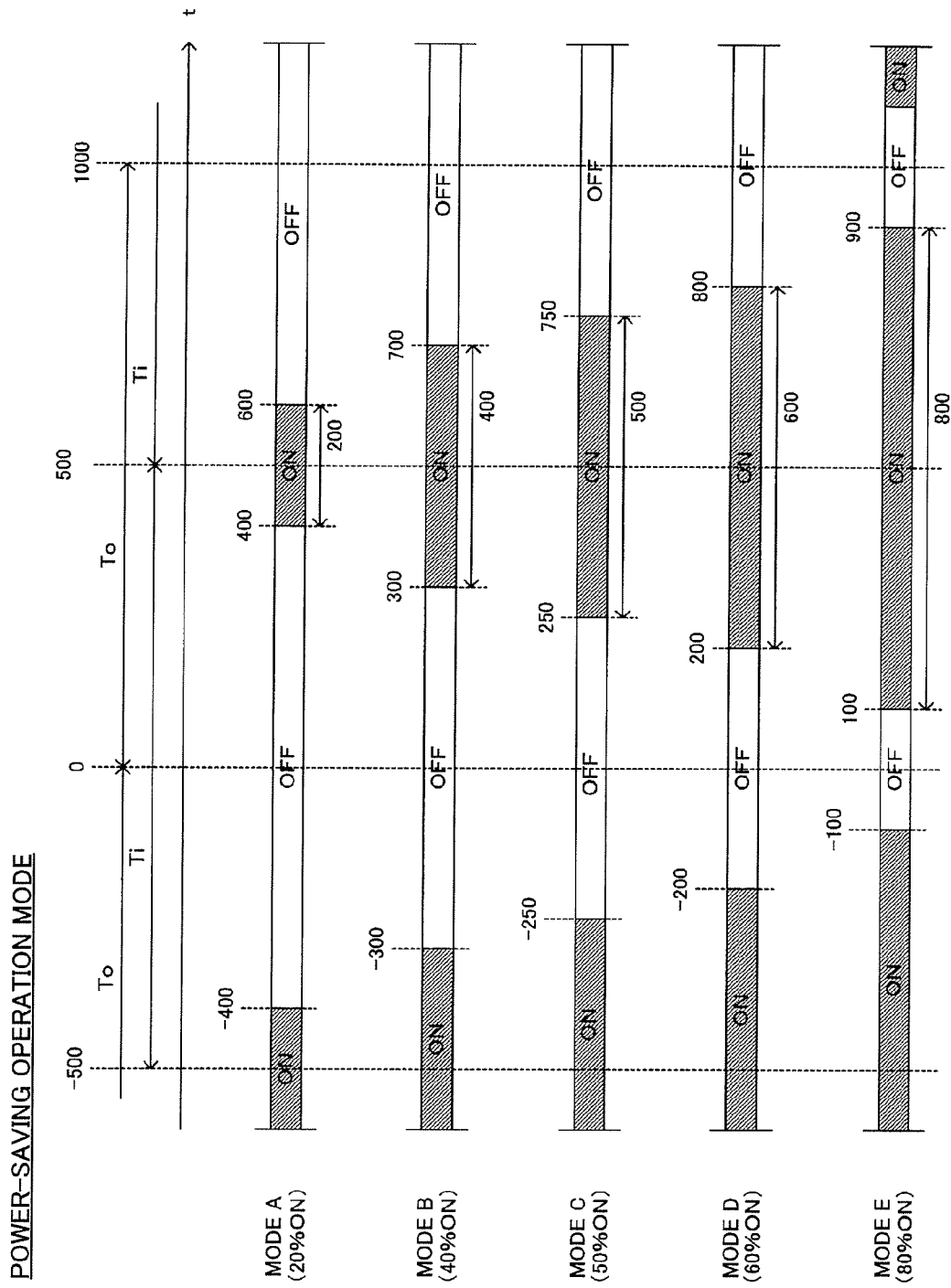
FIG. 6 is a view showing an example of a power-saving operation mode.

The ratio X of the ON period and the OFF period of the power-saving operation is variable. In this embodiment, a plurality of power-saving operation modes that differ in the ratio X are provided. Specifically, five modes A to E are provided. FIG. 6 is a view showing an example of the power-saving operation mode. In FIG. 6, the horizontal axis indicates the system time t. FIG. 6 shows the relationship between the ON/OFF period of the power-saving operation and the target period T in the positioning mode (outdoor/indoor mode) corresponding to each power-saving operation mode.

The power-saving operation modes include a mode A in which the ON period is 20%, a mode B in which the ON period is 40%, a mode C in which the ON period is 50%, a mode D in which the ON period is 60%, and a mode E in which the ON period is 80% (from top to bottom). In each power-saving operation mode, the interval between the intermediate times of the ON periods coincides with the target period Ti in the indoor mode, and the interval between the intermediate times of the OFF periods coincides with the target period To in the outdoor mode.

Configuration

Figure 7:
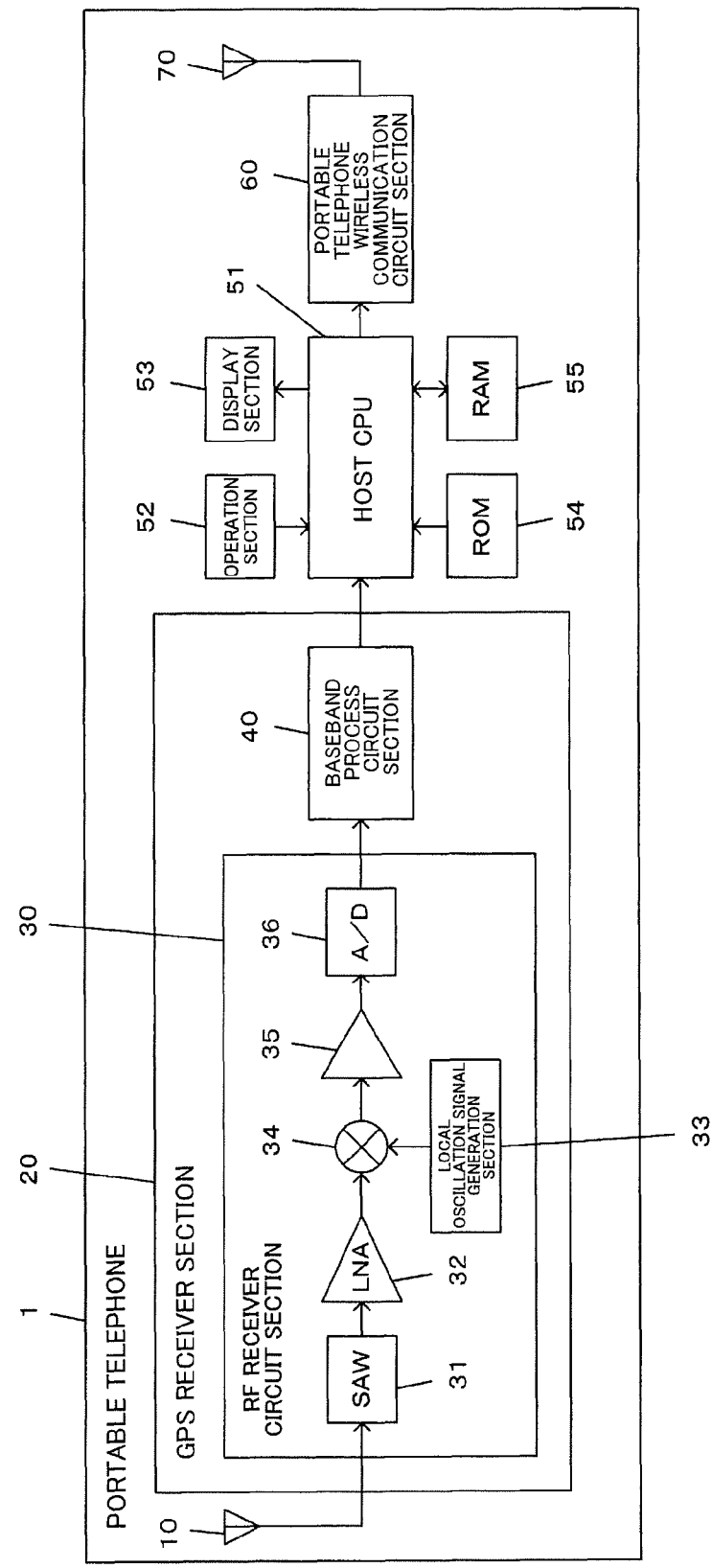
FIG. 7 is a configuration diagram showing a portable telephone.

FIG. 7 is a block diagram showing the internal configuration of a portable telephone 1 (i.e., GPS receiver). As shown in FIG. 7, the portable telephone 1 includes a GPS antenna 10, a GPS receiver section 20, a host central processing unit (CPU) 51, an operation section 52, a display section 53, a read-only memory (ROM) 54, a random access memory (RAM) 55, a portable telephone wireless communication circuit section 60, and a portable telephone antenna 70.

The GPS antenna 10 is an antenna that receives a radio-frequency (RF) signal including a GPS satellite signal transmitted from a GPS satellite. The GPS satellite signal is a spread spectrum modulated by the C/A code (PRN code). The GPS satellite signal is superimposed on a carrier in the L1 band (carrier frequency: 1.57542 GHz).

The GPS receiver section 20 acquires/extracts the GPS satellite signal from the RF signal received by the GPS antenna 10, and calculates the current position of the portable telephone 1 by performing positioning calculations based on a navigation message extracted from the GPS satellite signal and the like. The GPS receiver section 20 includes an RF receiver circuit section 30 and a baseband process circuit section 40.

The RF receiver circuit section 30 includes a surface acoustic wave (SAW) filter 31, a low-noise amplifier (LNA) 32, a local oscillation signal generation section 33, a multiplier section 34, an amplifier section 35, and an A/D conversion section 36. The RF receiver circuit section 30 receives a signal using a superheterodyne method.

The SAW filter 31 is a bandpass filter. The SAW filter 31 allows a given band signal of the RF signal input from the GPS antenna 10 to pass through while blocking a frequency component outside the given band, and outputs the resulting signal. The LNA (low-noise amplifier) 32 amplifies the signal input from the SAW filter 31, and outputs the amplified signal. The local oscillation signal generation section 33 includes an oscillator such as a local oscillator (LO), and generates a local oscillation signal. The multiplier section 34 includes a multiplier that synthesizes a plurality of signals. The multiplier section 34 down-converts the RF signal input from the LNA 32 into an intermediate-frequency signal (IF signal) by multiplying the RF signal by the local oscillation signal generated by the local oscillation signal generation section 33. The amplifier 35 amplifies the IF signal input from the multiplier section 34 by a given amplification factor. The A/D conversion section 36 converts the signal (analog signal) input from the amplifier section 35 into a digital signal.

Figure 8:
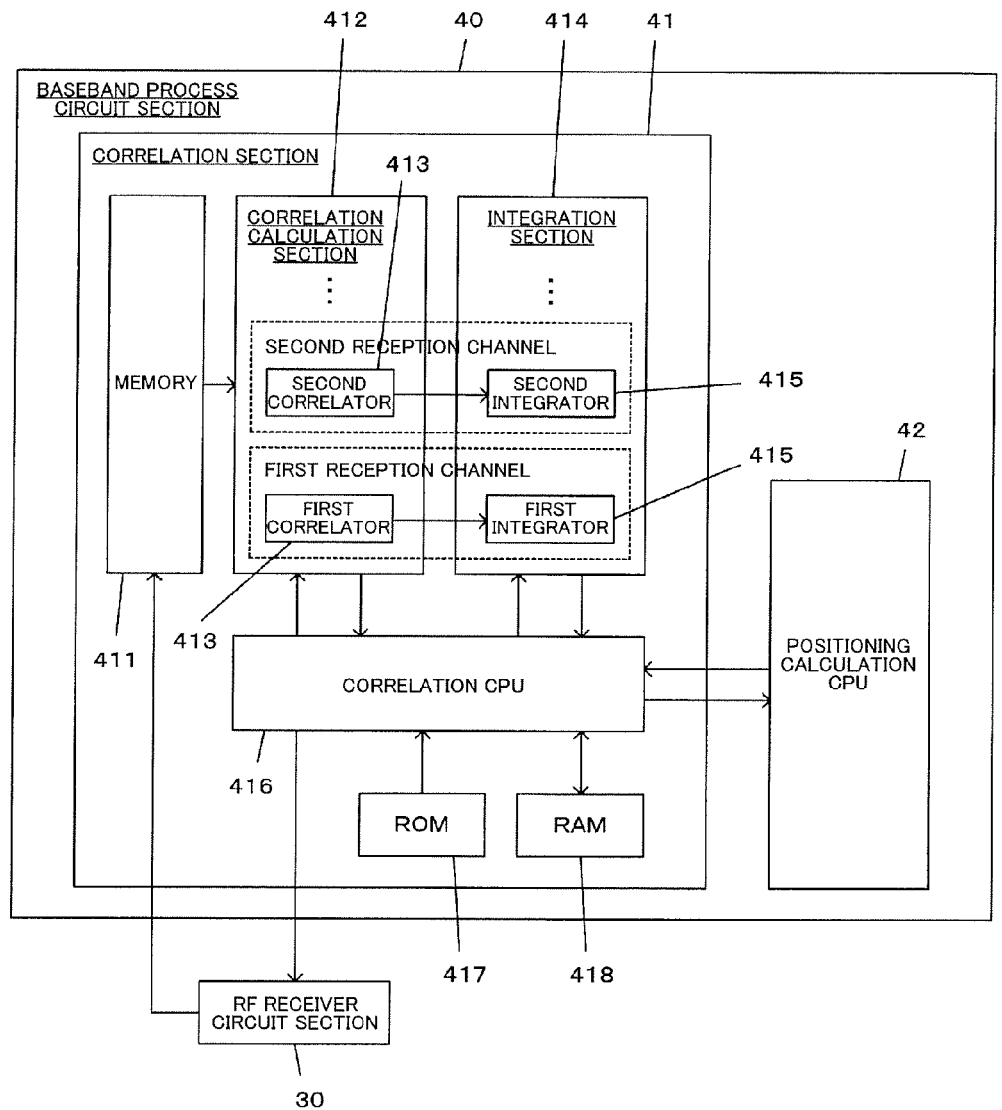
FIG. 8 is a configuration diagram showing a baseband process circuit section.

The baseband process circuit section 40 acquires/tracks the GPS satellite signal from the IF signal input from the RF receiver circuit section 30, and performs pseudo-range calculations, positioning calculations, and the like based on a navigation message, time information, and the like extracted by decoding the data contained in the GPS satellite signal. FIG. 8 shows the circuit configuration of the baseband process circuit section 40. As shown in FIG. 8, the baseband process circuit section 40 includes a correlation section 41 and a positioning calculation CPU 42.

The correlation section 41 acquires/tracks the GPS satellite signal from the IF signal input from the RF receiver circuit section 30, and calculates positioning calculation measurement information. The correlation section 41 includes a memory 411, a correlation calculation section 412, an integration section 414, a correlation CPU 416, a ROM 417, and a RAM 418.

The memory 411 stores data relating to the IF signal input from the RF receiver circuit section 30.

The correlation calculation section 412 includes n correlators 413. The correlator 413 performs correlation calculations on the data relating to the IF signal stored in the memory 411 and a code replica generated by a code replica generation section (not shown) while shifting the phase of the code replica. The code replica generation section generates a code replica that imitates the C/A code of the acquisition target GPS satellite under control of the correlation CPU 416.

The integration section 414 includes n integrators 415 that respectively correspond to the correlators 413. The integrator 415 integrates the correlation values input from the preceding-stage correlator 413 under control of the correlation CPU 416.

The correlators 413 and the integrators 415 form n reception channels in combination. The positioning mode (outdoor/indoor) and the acquisition target GPS satellite can be independently controlled corresponding to each reception channel.

The correlation CPU 416 controls each section of the correlation section 41. The correlation CPU 416 performs a measurement information calculation process that calculates the measurement information while controlling the power-saving operation. In the measurement information calculation process, the correlation CPU 416 controls the ON (execution)/OFF (suspension) state of the operations of the correlation calculation section 412 and the RF receiver circuit section 30 corresponding to the current power-saving operation mode according to a power-saving operation control table 4172.

Figure 9:
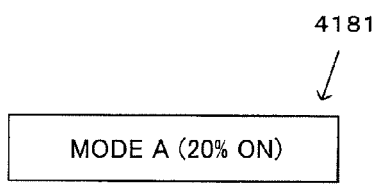
FIG. 9 shows a data configuration example of power-saving operation mode data.

The current power-saving operation mode is stored as power-saving operation mode data 4181. FIG. 9 shows an example of the data configuration of the power-saving operation mode data 4181. As shown in FIG. 9, the current power-saving operation mode is stored as the power-saving operation mode data 4181. The power-saving operation mode is appropriately changed based on a change instruction signal from the positioning calculation CPU 42, for example.

Figures 10, 11, 12:
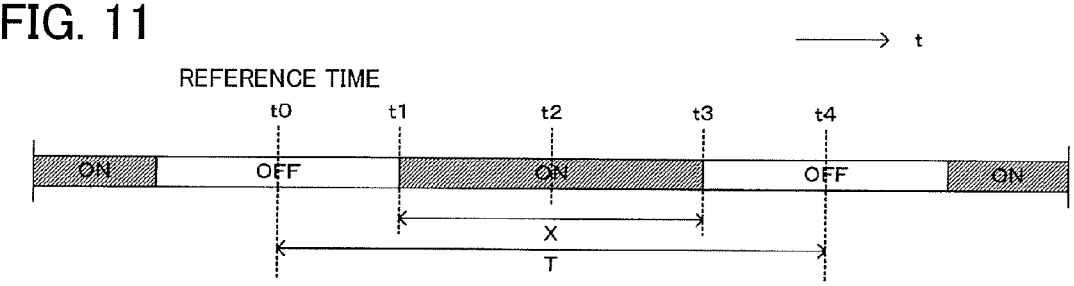
FIG. 10 shows a data configuration example of a power-saving operation control table.
FIG. 11 is a view illustrative of the timing setting of a power-saving operation and a positioning mode.
FIG. 12 shows a data configuration example of a correlation operation control table.

The power-saving operation control table 4172 is a data table that defines the ON/OFF control timing of the power-saving operation. FIG. 10 shows an example of the data configuration of the power-saving operation control table 4172. As shown in FIG. 10, the power-saving operation control table 4172 stores an ON period ratio 4172*b*, an ON period start timing (ON timing) 4172*c*, and an OFF period start timing (OFF timing) 4172*d* corresponding to each power-saving operation mode 4172*a*. The value of the ON/OFF period start timing in the power-saving operation control table 4172 is set as follows.

FIG. 11 is a view illustrative of the ON/OFF timing setting of the power-saving operation mode. As shown in FIG. 11, the intermediate time of the OFF period is defined as the reference time t0, and the intermediate time of the subsequent OFF period is defined as the time t4. Specifically, a period from the reference time t0 to the time t4 corresponds to the target period To in the outdoor mode, and is equal to the target period T in the indoor outdoor/mode. The ratio of the ON period to the cycle T is referred to as X. Note that $0<X<1$.

The time t1 that is the start time of the ON period is given by the following expression (3).

$$t1=t0+(T\times(1-X)/2) \quad (3)$$

The time t2 that is the intermediate time of the ON period corresponds to the intermediate time of the cycle T, and is given by the following expression (4).

$$t2=t0+T/2 \quad (4)$$

The time t3 that is the start time of the OFF period is given by the following expression (5).

$$t3=t0+(T\times(1-X)/2)+(T\times X) \quad (5)$$

Specifically, the time t1 is the ON timing, and the time t3 is the OFF timing.

In the power-saving operation control table 4172, the ON/OFF timing is defined as the time t1 and t3 when the reference time t0 is zero (i.e., the time elapsed from the reference time t0). FIG. 10 shows an example in which an operation cycle Tp is 1000.

The correlation CPU 416 calculates the measurement information based on the correlation calculation result corresponding to each reception channel according to a correlation operation control table 4173 corresponding to the current power-saving operation mode.

The correlation operation control table 4173 is a data table that defines the measurement information calculation control timing. FIG. 12 shows an example of the data configuration of the correlation operation control table 4173. As shown in FIG. 12, the correlation operation control table 4173 stores a measurement information calculation timing 4173b and an integration reset timing 4173c when the integrated value (i.e., the correlation calculation result) of the integrator 415 is reset corresponding to each power-saving operation mode 4173a. The measurement information 4173b and the integration reset timing 4173c are stored corresponding to each of the indoor mode and the outdoor mode.

The timing value stored in the correlation operation control table 4173 is defined as the time elapsed from the reference time t0 in the same manner as the ON/OFF timing of the power-saving operation mode shown in FIG. 11. In FIG. 11, the times t0 and t4 respectively coincide with the start time and the end time of the target period To in the outdoor mode. Specifically, the times t0 and t4 correspond to the measurement information calculation timing and the integration reset timing in the outdoor mode. The second period of the target period To in the outdoor mode is the OFF period. Therefore, the measurement information calculation timing in the indoor mode may be set at the time t3 (i.e., the end time of the ON period) instead of the time t4.

The positioning mode of each reception channel is defined as positioning mode data 4182. FIG. 13 shows an example of the data configuration of the positioning mode data 4182. As shown in FIG. 13, a current positioning mode 4182b and an acquisition target satellite 4182c are stored as the positioning mode data 4182 corresponding to each reception channel 4182a. The positioning mode and the acquisition target satellite set corresponding to each reception channel are appropriately changed based on a change instruction signal from the positioning calculation CPU 42, for example.

The measurement information calculated by the correlation CPU 416 is output to the positioning calculation CPU 42 in the subsequent stage together with the data relating to the measurement time, the positioning mode, the acquisition target satellite, and the like.

The ROM 417 stores a system program that causes the correlation CPU 416 to control each section of the baseband process circuit section 40 and the RF receiver circuit section 30, various programs and data necessary for implementing various processes including the baseband process, and the like. FIG. 14 shows the configuration of the ROM 417. As shown in FIG. 14, the ROM 417 stores a measurement information calculation program 4171, the power-saving operation control table 4172, and the correlation operation control table 4173.

The RAM 418 is used as a work area for the correlation CPU 416. The RAM 418 temporarily stores a program and data read from the ROM 417, calculation results obtained by the correlation CPU 416 based on various programs, and the like. FIG. 15 shows the configuration of the RAM 418. As shown in FIG. 15, the RAM 418 stores the power-saving operation mode data 4181 and the positioning mode data 4182.

The positioning calculation CPU 42 calculates the current position of the portable telephone 1 based on the measurement information calculated by the correlation CPU 416 (i.e., positioning calculations). Specifically, the positioning calculation CPU 42 performs positioning calculations using the measurement information in each positioning mode input from the correlation CPU 416 at a timing after the measurement information has been calculated in the indoor mode, for example. In this case, the measurement time of the measurement information calculated in the indoor mode coincides with the measurement time of the measurement information calculated in the outdoor mode, as shown in FIG. 3. The fix time corresponds to the measurement time. The positioning result (current position) calculated by the positioning calculation CPU 42 is output to the host CPU 51 in the subsequent stage.

Again referring to FIG. 7, the host CPU 51 controls each section of the portable telephone 1 based on various programs such as a system program stored in the ROM 54. Specifically, the host CPU 51 mainly implements a telephone call function, and also performs a process that implements various functions including a navigation function such as causing the display section 53 to display a navigation screen in which the current position of the portable telephone 1 input from the baseband process circuit section 40 is plotted on a map.

The operation section 52 is an input device that includes an operation key, a button switch, and the like. The operation section 52 outputs an operation signal corresponding to the operation performed by the user to the host CPU 51. Various instructions such as a positioning start/finish instruction are input by operating the operation section 52. The display section 53 is a display device such as a liquid crystal display (LCD). The display section 53 displays a display screen (e.g., navigation screen and time information) based on a display signal input from the host CPU 51.

The ROM 54 stores a system program that causes the host CPU 51 to control the portable telephone 1, a program and data necessary for implementing the navigation function, and the like. The RAM 55 is used as a work area for the host CPU 51. The RAM 55 temporarily stores a program and data read from the ROM 54, data input from the operation section 52, calculation results of the host CPU 51 based on various programs, and the like.

The portable telephone wireless communication circuit section 60 is a portable telephone communication circuit section which includes an RF conversion circuit, a baseband process circuit, and the like, and transmits and receives a radio signal under control of the host CPU 51. The portable telephone antenna 70 is an antenna which transmits and receives a portable telephone radio signal between the portable telephone 1 and a radio base station installed by a communication service provider of the portable telephone 1.

Process Flow

Figure 16:
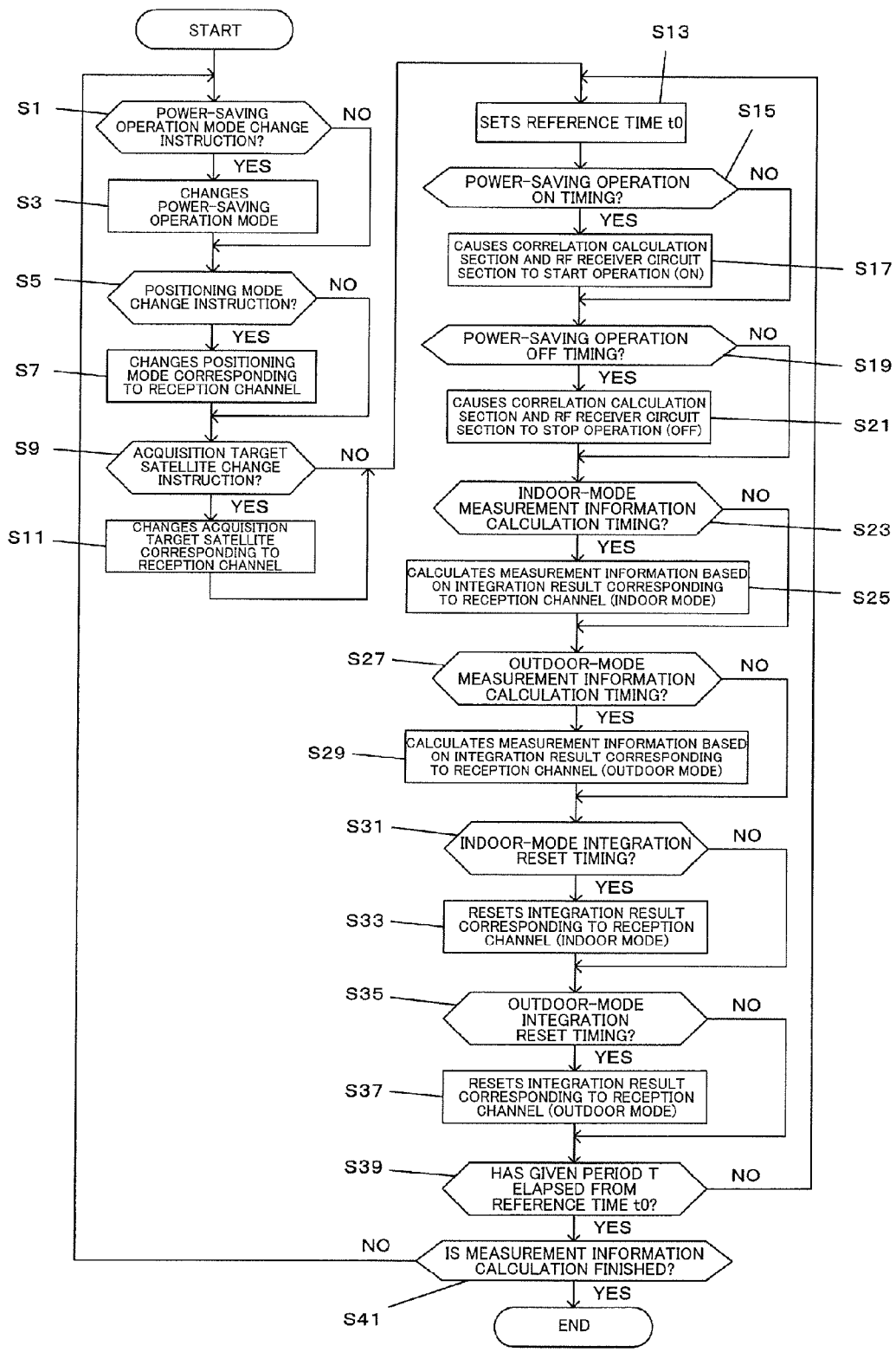
FIG. 16 is a flowchart showing a measurement information calculation process.

FIG. 16 is a flowchart illustrative of the flow of the measurement information calculation process executed by the correlation CPU 416. As shown in FIG. 16, when a power-saving operation mode change instruction has been input from the positioning calculation CPU 42, for example (step S1: YES), the correlation CPU 416 changes the power-saving operation mode in response to the change instruction (step S3). When a positioning mode change instruction has been input (step S5: YES), the correlation CPU 416 changes the positioning mode corresponding to each reception channel in response to the change instruction (step S7). When an acquisition target satellite change instruction has been input (step S9: YES), the correlation CPU 416 changes the acquisition target satellite corresponding to each reception channel in response to the change instruction (step S11).

The correlation CPU 416 then sets the current system time as the reference time t0, for example (step S13). The correlation CPU 416 refers to the power-saving operation control table 4172 and the correlation operation control table 4173, and determines whether or not timing has been reached by determining whether or not the time elapsed from the reference time t0 has reached the time corresponding to the current power-saving operation mode specified for each timing. The correlation CPU 416 performs a process corresponding to the timing that has been reached.

Specifically, when the ON timing of the power-saving operation has been reached (step S15: YES), the correlation CPU 416 causes the correlation calculation section 412 and the RF receiver circuit section 30 to start operation (ON) (step S17). When the OFF timing of the power-saving operation has been reached (step S19: YES), the correlation CPU 416 causes the correlation calculation section 412 and the RF receiver circuit section 30 to stop operation (OFF) (step S21).

When the measurement information calculation timing in the indoor mode has been reached (step S23: YES), the correlation CPU 416 calculates the measurement information based on the correlation calculation result corresponding to each reception channel of which the positioning mode is set in the indoor mode, and outputs the measurement information to the positioning calculation CPU 42 (step S25). When the measurement information calculation timing in the outdoor mode has been reached (step S27: YES), the correlation CPU 416 calculates the measurement information based on the correlation calculation result corresponding to each reception channel of which the positioning mode is set in the outdoor mode, and outputs the measurement information to the positioning calculation CPU 42 (step S29).

When the integration reset timing in the outdoor mode has been reached (step S31: YES), the correlation CPU 416 resets the integrated value of each reception channel of which the positioning mode is set in the outdoor mode (step S33). When the integration reset timing in the indoor mode has been reached (step S35: YES), the correlation CPU 416 resets the integrated value of each reception channel of which the positioning mode is set in the indoor mode (step S37).

The correlation CPU 416 then determines whether or not the given period T has elapsed from the reference time t0. When the given period T has not elapsed from the reference time t0 (step S39: NO), the correlation CPU 416 returns to the step S13. When the given period T has elapsed from the reference time t0 (step S39: YES), the correlation CPU 416 determines whether or not to finish measurement information calculations by determining whether or not a measurement information calculation finish instruction has been input, for example. When the correlation CPU 416 has determined to continue measurement information calculations (step S41: NO), the correlation CPU 416 returns to the step S1. When the correlation CPU 416 has determined to finish measurement information calculations (step S41: YES), the correlation CPU 416 finishes the measurement information calculation process.

Modification

Embodiments to which the invention may be applied are not limited to the above-described embodiments. Various modifications and variations may be made without departing from the scope and the spirit of the invention.

(1) Change in Power-Saving Operation Mode

In the above-described embodiments, a plurality of power-saving operation modes (modes A to E) are provided in advance, and the power-saving operation mode is changed between these power-saving operation modes. Note that the ratio X of the ON period of the power-saving operation may be arbitrarily set in the range from 0 to 1.0. In this case, each timing (e.g., the ON/OFF timing of the power-saving operation, the measurement information calculation timing and the integrated value reset timing in each positioning mode) is calculated and set as described with reference to FIG. 11 each time the ratio X is changed.

(2) Variable Target Period

In the above-described embodiments, the correlation calculation process is performed in a state in which the target period To in the outdoor mode and the target period Ti in the indoor mode are set at 1 sec (1000 msec). Note that the target period may be variably set in the outdoor mode and the indoor mode. The details are described below.

(2-1) When To<Ti

Figure 17:
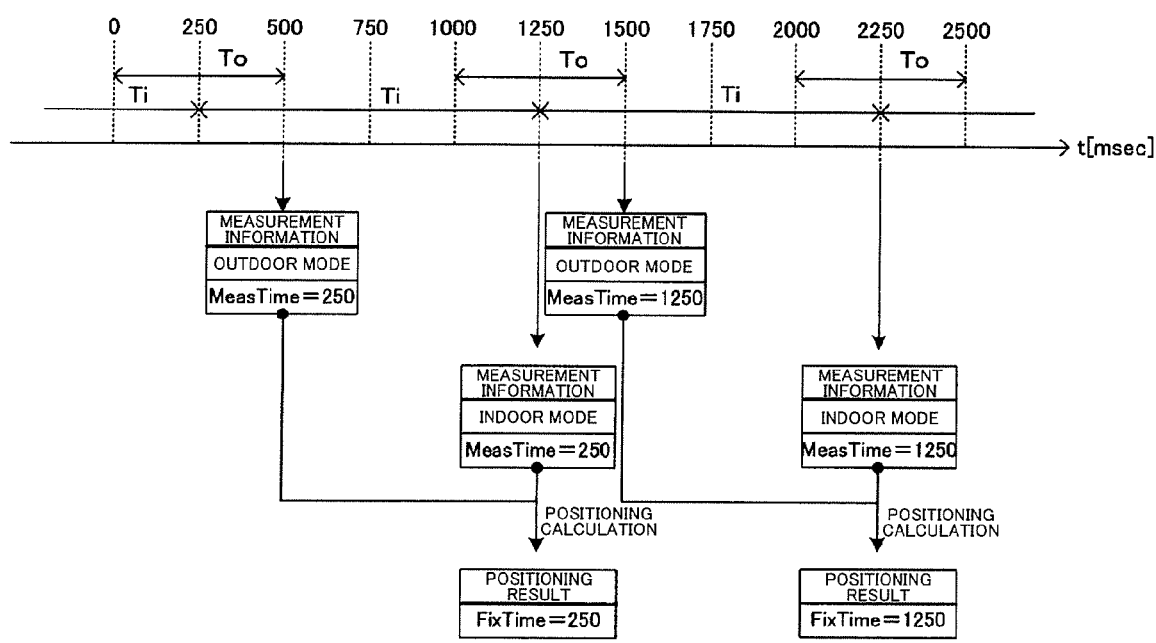
FIG. 17 is a view illustrative of the case where an outdoor mode and an indoor mode are executed in parallel in a modification.

FIG. 17 is a view illustrative of the operations in the indoor mode and the outdoor mode when the target period To in the outdoor mode is set at 500 msec and the target period Ti in the indoor mode is set at 1000 msec (To<Ti). In FIG. 17, a period that corresponds to the ON period of the power-saving operation mode is indicated by an arrow. A period that is not indicated by an arrow corresponds to the OFF period of the power-saving operation mode.

In the outdoor mode, the correlation value is calculated in the target period To from the time t=0 to the time t=500, for example. The average value of the correlation values calculated in the 500 msec period is taken as the correlation calculation result in the target period. The measurement information is calculated in the outdoor mode at the time t=500. The measurement time of the measurement information in the outdoor mode is the intermediate time "250" of the target period To (from the time t=0 to the time t=500).

In the indoor mode, the correlation calculation process is started at the time t=250 that is 250 msec (i.e., half of the target period To) after the start time in the outdoor mode. The correlation values are integrated in the target period Ti from the time t=250 to the time t=1250. The measurement information is calculated in the indoor mode at the time t=1250. The measurement time of the measurement information in the indoor mode is the start time "250" that is the integration reference time of the target period Ti (from the time t=250 to the time t=1250).

Positioning calculations are performed at the time t=1250 based on the measurement information calculated in the outdoor mode and the indoor mode. The fix time (250) of the positioning result is identical to the measurement time. The OFF period occurs in the outdoor mode from the time t=500 to the time t=1000 (i.e., only the process in the indoor mode is performed). The ON period again occurs in the outdoor mode at the time t=1000. In the indoor mode, the correlation values are integrated in the target period Ti from the time t=1250 to the time t=2250 after the measurement information has been calculated at the time t=1250. Therefore, the entire period in the indoor mode is the ON period.

The measurement information is calculated in the outdoor mode at the time t=1500, and the measurement information is calculated in the indoor mode at the time t=2250. In this case, the measurement time in the outdoor mode and the measurement time in the indoor mode are 1250. Positioning calculations are performed at the time t=1250 based on the measurement information calculated in the outdoor mode and the indoor mode. The fix time (1250) of the positioning result is identical to the measurement time.

Figure 18:
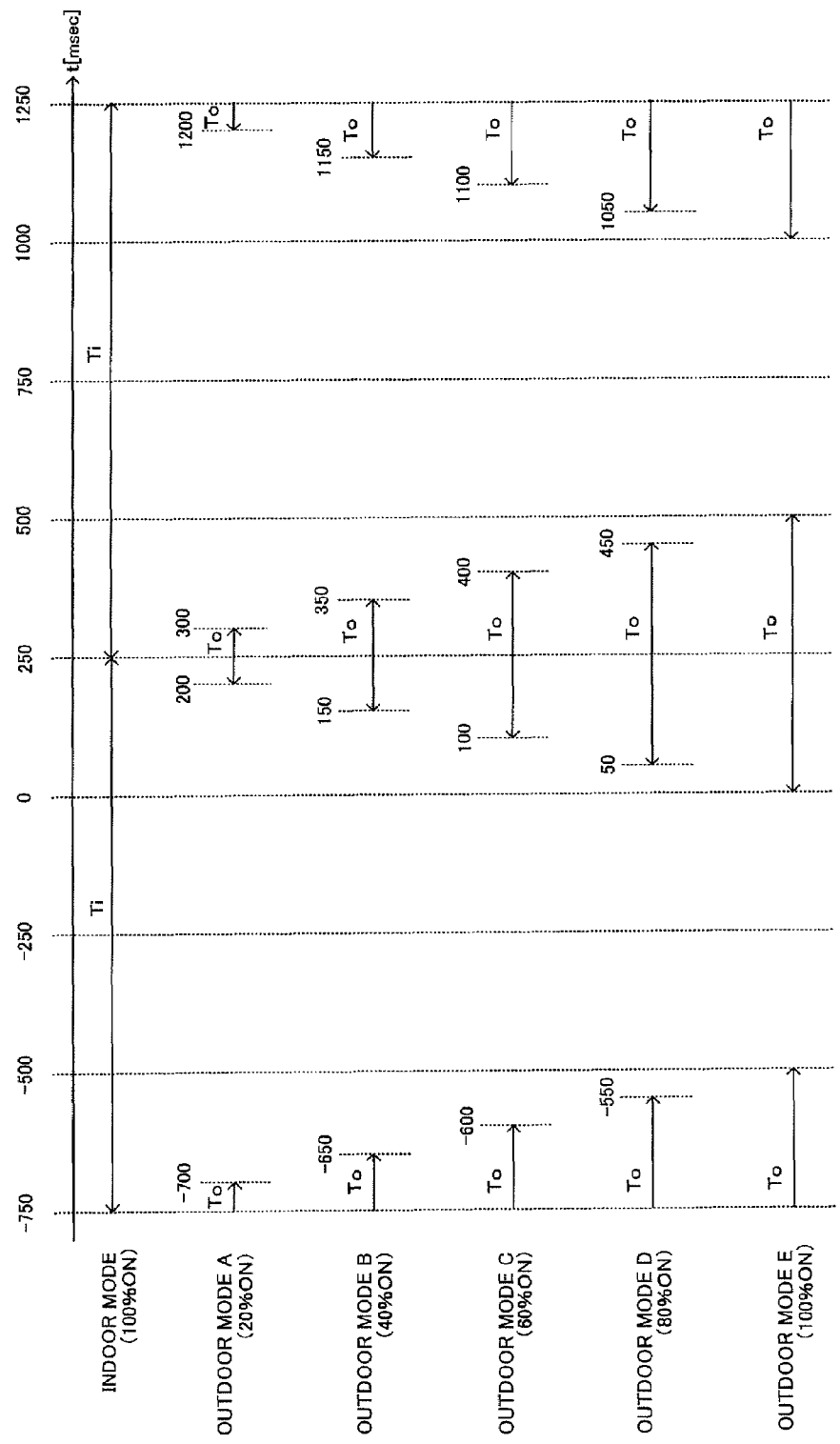
FIG. 18 is a view showing an example of a power-saving operation mode according to a modification.

FIG. 18 is a view illustrative of the power-saving operation mode employed in this modification. As described above, the entire period in the indoor mode is the ON period (100% ON). In the outdoor mode, the ON period and the OFF period are repeated using a period equal to the target period To as the operation period. In the outdoor mode A (20% ON), a 100 msec period from the time t=200 to the time t=300 across the time t=250 that is the start time (integration reference time) of the indoor mode is set as the ON period.

In the outdoor mode B (40% ON), a 200 msec period from the time t=150 to the time t=350 is set as the ON period. In the outdoor mode C (60% ON), a 300 msec period from the time t=100 to the time t=400 is set as the ON period. In the outdoor mode D (80% ON), a 400 msec period from the time t=50 to the time t=450 is set as the ON period. In the outdoor mode E (100% ON), a 500 msec period from the time t=0 to the time t=500 is set as the ON period. In each mode, the intermediate time of the ON period in the outdoor mode coincides with the start time/end time of the target period Ti in the indoor mode.

(2-2) When To>Ti

Figure 19:
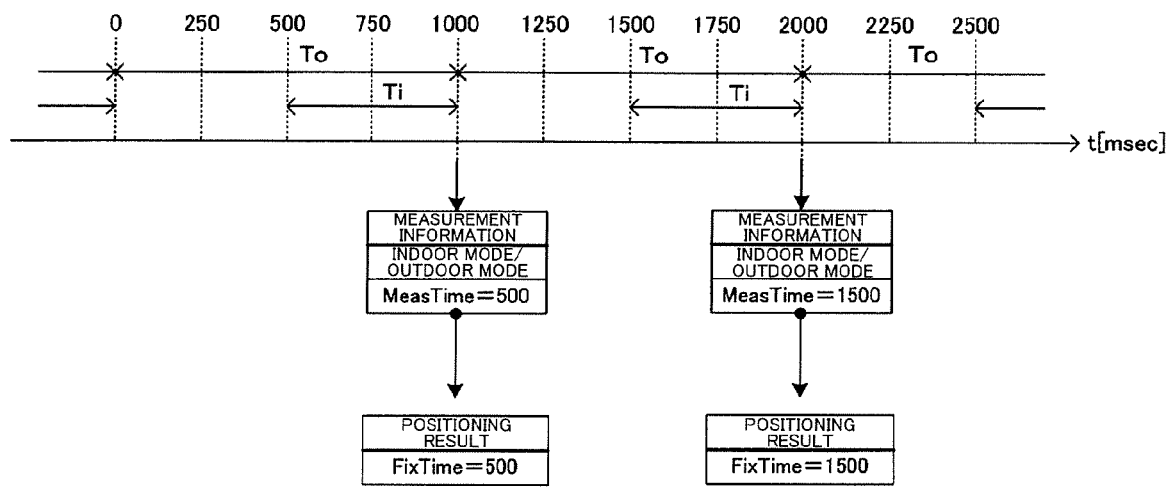
FIG. 19 is a view illustrative of the case where an outdoor mode and an indoor mode are executed in parallel in a modification.

FIG. 19 is a view illustrative of the operations in the indoor mode and the outdoor mode when the target period To in the outdoor mode is set at 1000 msec and the target period Ti in the indoor mode is set at 500 msec (To>Ti). In FIG. 19, a period that corresponds to the ON period of the power-saving operation mode is indicated by an arrow. A period that is not indicated by an arrow corresponds to the OFF period.

In the outdoor mode, the correlation value is calculated in the target period To from the time t=0 to the time t=1000, for example. The average value of the correlation values calculated in the 1000 msec period is taken as the correlation calculation result in the target period. The measurement information is calculated in the outdoor mode at the time t=1000. The measurement time of the measurement information in the outdoor mode is the intermediate time "500" of the target period To (from the time t=0 to the time t=1000).

In the indoor mode, the correlation calculation process is started at the time t=500 that is 500 msec (i.e., half of the target period To) after the start time in the outdoor mode. The correlation values are integrated in the target period Ti from the time t=500 to the time t=1000. The measurement information is calculated in the indoor mode at the time t=1000. The measurement time of the measurement information in the indoor mode is the start time (integration reference time) "500" of the target period Ti (from the time t=500 to the time t=1000).

Positioning calculations are performed at the time t=1000 based on the measurement information calculated in the outdoor mode and the measurement information calculated in the indoor mode. The fix time (500) of the positioning result is identical to the measurement time. The OFF period occurs in the indoor mode from the time t=1000 to the time t=1500 (i.e., only the process in the outdoor mode is performed). The ON period again occurs in the indoor mode at the time t=1500. In the outdoor mode, the correlation values are integrated in the target period To from the time t=1000 to the time t=2000 after the measurement information has been calculated at the time t=1000. Therefore, the entire period in the outdoor mode is the ON period.

The measurement information is calculated in the outdoor mode and the indoor mode at the time t=2000. In this case, the measurement time in the outdoor mode and the measurement time in the indoor mode are 1500. Positioning calculations are performed at the time t=2000 based on the measurement information calculated in the outdoor mode and the measurement information calculated in the indoor mode. The fix time (1500) of the positioning result is identical to the measurement time.

Figure 20:
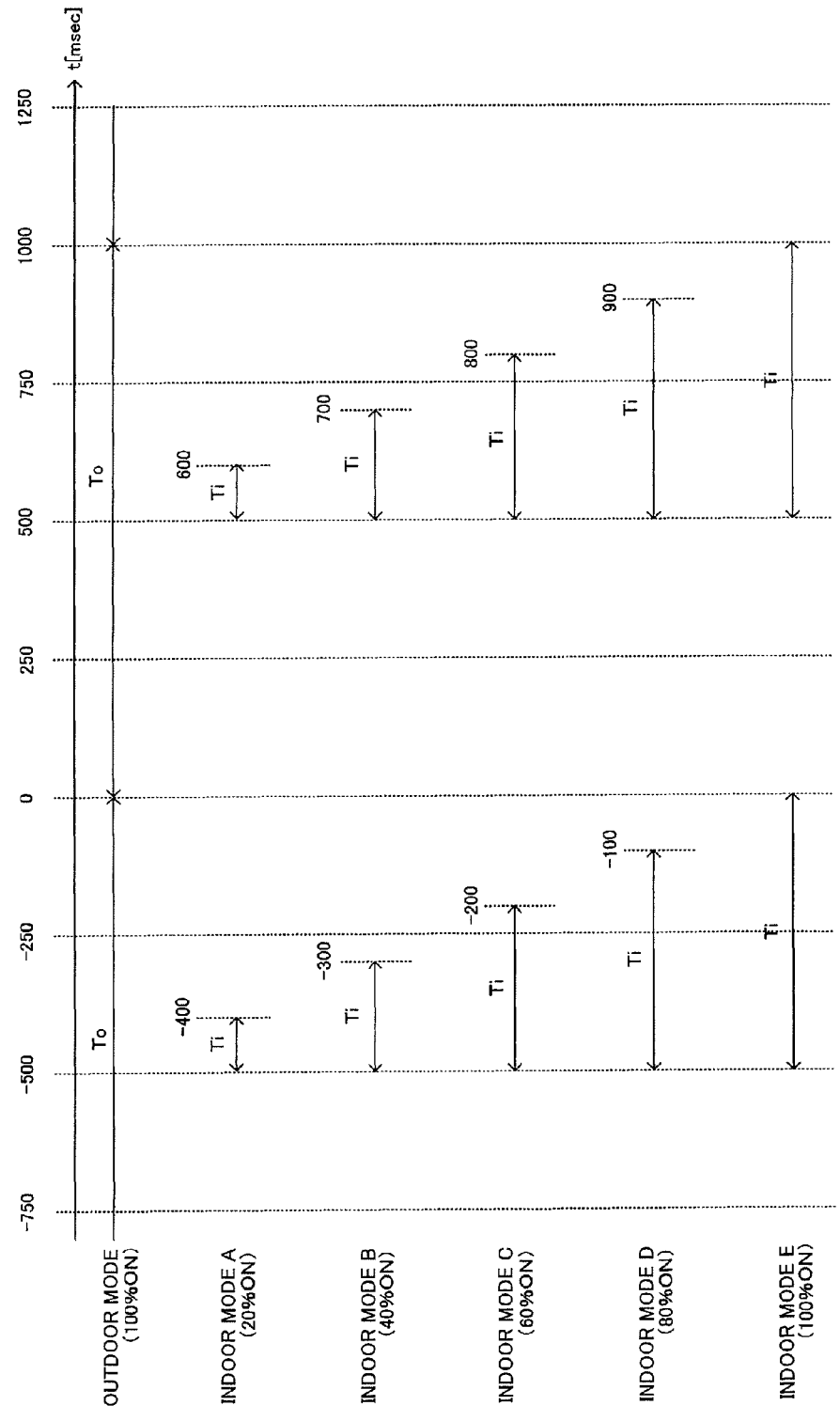
FIG. 20 is a view showing an example of a power-saving operation mode according to a modification.

FIG. 20 is a view illustrative of the power-saving operation mode employed in this modification. As described above, the entire period in the outdoor mode is the ON period (100% ON). In the indoor mode, the ON period and the OFF period are repeated using a period equal to the target period Ti as the operation period. In the indoor mode A (20% ON), a 100 msec period from the time t=500 (start time (integration reference time): intermediate time in the outdoor mode) to the time t=600 is set as the ON period.

In the indoor mode B (40% ON), a 200 msec period from the time t=500 to the time t=700 is set as the ON period. In the indoor mode C (60% ON), a 300 msec period from the time t=500 to the time t=800 is set as the ON period. In the indoor mode D (80% ON), a 400 msec period from the time t=500 to the time t=900 is set as the ON period. In the indoor mode E (100% ON), a 500 msec period from the time t=500 to the time t=1000 is set as the ON period. In each mode, the intermediate time in the outdoor mode coincides with the start time of the target period Ti (integration reference time in the indoor mode).

It is possible to cause the measurement time in the outdoor mode to coincide with the measurement time in the indoor mode so that the measurement information at the same time is calculated by shifting the target period To and the target period Ti by setting the intermediate time of the target period To to be the same as the start time (integration reference time) of the target period Ti, and variably setting the ratio of the ON/OFF period in one of the target periods shorter than the other target period.

(3) Host CPU

In the above-described embodiments, the positioning calculation CPU 42 provided in the baseband process circuit section 40 performs positioning calculations. Note that the host CPU 51 may perform positioning calculations. In the above-described embodiments, the correlation section 41 performs the correlation calculation process to acquire/track the GPS satellite signal. Note that the host CPU 51 may perform the correlation calculation process to acquire/track the GPS satellite signal.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A position calculation method comprising:
    receiving a first satellite signal from a first positioning satellite and a second satellite signal from a second positioning satellite;
    configuring a first reception channel to execute a first mode of correlation corresponding to an outdoor mode, the first mode being a mode that obtains a first correlation result corresponding to a first measurement time by averaging a plurality of correlation values between a code replica and the received first satellite signal sampled at prescribed sampling intervals during a first period, the first measurement time being an intermediate time between a start time and an end time of the first period;

configuring a second reception channel to execute a second mode of correlation corresponding to an indoor mode, the second mode being a mode that obtains a second correlation result corresponding to a second measurement time by integrating a plurality of correlation values between the code replica and the received second satellite signal sampled at the prescribed sampling intervals during a second period, the second measurement time being a prescribed integration reference time in the second period;

executing the first mode and the second mode in parallel while the first period and the second period overlap each other such that the first measurement time coincides with the second measurement time; and obtaining a positioning result that has a fix time which coincides with both the first measurement time and the second measurement time by performing a position calculation using the first correlation result and the second correlation result.

2. The position calculation method as defined in claim 1, wherein
the first period and the second period are shifted by half of the first period and the second period; and
the prescribed integration reference time is a start time or an end time of the second period.

3. The position calculation method as defined in claim 2, wherein
an ON period and an OFF period that respectively occur at identical timings are set in the first period and the second period; and
an interval between an intermediate time of the ON period and an intermediate of the subsequent ON period corresponds to the second period, and an interval between an intermediate time of the OFF period and an intermediate time of the subsequent OFF period corresponds to the first period.

4. The position calculation method as defined in claim 1, wherein
an ON period and an OFF period are set in the first period; and
an intermediate time of the ON period of the first period are the same as the second measurement time of the second period.

5. The position calculation method as defined in claim 1, wherein
an ON period and an OFF period are set in the second period; and
the intermediate time of the first period is the same as the second measurement time of the second period.

6. The position calculation method as defined in claim 1, further comprising:
inputting an instruction signal relating to a ratio of an ON/OFF period in the first period or the second period, the ratio of the ON/OFF period being variably set based on the instruction signal.

7. The position calculation method as defined in claim 1, wherein
the second period is longer than 20 msec.

8. A position calculation device comprising:
a receiver section configured to receive a first satellite signal from a first positioning satellite and second satellite signal from a second positioning satellite;
a control circuit configured to:
configure a first reception channel to execute a first mode of correlation corresponding to an outdoor mode, the first mode being a mode that obtains a first correlation result corresponding to a first measurement time by averaging a plurality of correlation values between a code replica and the received first satellite signal sampled at prescribed sampling intervals during a first period, the first measurement time being an intermediate time between a start time and an end time of the first period;
configure a second reception channel to execute a second mode of correlation corresponding to an indoor mode, the second mode being a mode that obtains a second correlation result corresponding to a second measurement time by integrating a plurality of correlation values between the code replica and the received second satellite signal sampled at the prescribed sampling intervals during a second period, the second measurement time being a prescribed integration reference time in the second period;
a correlation calculation circuit configured to execute the first mode and the second mode in parallel while the first period and the second period overlap each other such that the first measurement time coincides with the second measurement time; and
a positioning calculation circuit that performs a position calculation using the first correlation result and the second correlation result and obtains a positioning result that has a fix time which coincides with both the first measurement time and the second measurement time.

9. The position calculation device as defined in claim 8, wherein
the second period is longer than 20 msec.

* * * * *